United States Patent
Sanders

(10) Patent No.: US 12,520,823 B1
(45) Date of Patent: Jan. 13, 2026

(54) PET DOOR GROOMER

(71) Applicant: Paula F. Sanders, Las Vegas, NV (US)

(72) Inventor: Paula F. Sanders, Las Vegas, NV (US)

(*) Notice: Subject to any disclaimer, the term of this patent is extended or adjusted under 35 U.S.C. 154(b) by 0 days.

(21) Appl. No.: 18/824,065

(22) Filed: Sep. 4, 2024

(51) Int. Cl.
  *A01K 13/00* (2006.01)
  *E06B 7/32* (2006.01)

(52) U.S. Cl.
  CPC .............. *A01K 13/004* (2013.01); *E06B 7/32* (2013.01)

(58) Field of Classification Search
  CPC .................................. A01K 13/004; E06B 7/32
  See application file for complete search history.

(56) References Cited

U.S. PATENT DOCUMENTS

| | | | |
|---|---|---|---|
| 4,938,169 A * | 7/1990 | Barmakian | A01K 1/035 119/501 |
| 5,546,895 A * | 8/1996 | Brown | E06B 7/32 119/625 |
| 9,986,719 B1 * | 6/2018 | Sanders | A01K 13/002 |
| 2008/0163550 A1 * | 7/2008 | Lomax | E06B 7/32 49/70 |
| 2011/0232579 A1 | 9/2011 | Clayson | |
| 2017/0159353 A1 * | 6/2017 | Clifton | E05C 19/16 |

FOREIGN PATENT DOCUMENTS

DE 202011108711 U1 * 3/2012 ........... A01K 13/004

OTHER PUBLICATIONS

English translation of DE 202011108711 U1 (Year: 2012).*

* cited by examiner

*Primary Examiner* — Morgan T Jordan
*Assistant Examiner* — Danielle A Clerkley
(74) *Attorney, Agent, or Firm* — Sanchelima & Associates, P.A.; Jesus Sanchelima; Christian Sanchelima

(57) ABSTRACT

A pet door groomer includes a pet door and a removably attached pet door pad. The pet door pad has a truncated cone shape with the apex plane attached at the top of the pet door and a wider base at the bottom. The pad contains perforations distributed across its surface that allow it to flexibly expand and contract. Bristles are disposed on both sides of the pad. As a pet passes through, the pad expands to accommodate the pet while the bristles brush against its fur. The brushing action helps remove loose hair, dirt, and allergens from the pet before entering a home. The perforations restore the pad to its original state after the pet passes through. The groomer decreases transfer of allergens and dirt from the pet's fur into the home. The pad can be replaced when dirty for optimal effectiveness.

4 Claims, 3 Drawing Sheets

PET DOOR GROOMER

II. BACKGROUND OF THE INVENTION

1. Field of the Invention

The present invention relates to a pet door groomer and, more specifically, to a removable grooming attachment for pet doors that gently brushes pets' fur as they pass through to remove dirt, loose hair, and other debris. The pet door groomer provides a simple, economical way to groom pets and limit the amount of shed hair, pollen, and other allergens brought indoors. The invention comprises a uniquely shaped pad with perforations and bristles that can be customized based on pet size and coat length. After outdoor activity, the groomer helps restore the cleanliness of pets' coats prior to re-entry, improving pet hygiene while also maintaining a cleaner indoor environment for residents. The easy installation, operation, and maintenance of the pet door groomer provides a convenient solution for pet owners seeking to reduce indoor allergens.

2. Description of the Related Art

Several designs for pet doors and grooming devices have been developed, yet they lack key features of the present invention. Existing pet doors allow pets to freely pass in and out of a building, but do not actively groom the pet's coat in the process. Some brushes and wiping products are available to attach near a pet door, but these require pet owners to actively engage with the device. The present invention operates passively as pets walk through, eliminating the need for human involvement each time. Though grooming brushes exist, their rigid design does not flexibly accommodate pets of different sizes. The perforated cone shape of the present invention stretches to a customizable degree. Prior art also includes a grooming brush pet door, but its dense brush fibers do not effectively remove all loose hairs or debris. The present invention's perforations allow deeper cleaning by bristles. No existing devices offer the simplicity of a disposable pad insert that can be replaced when dirty. The present invention combines effective pet grooming features into one device not previously found in the related art.

Applicant believes that a related reference corresponds to U.S. Patent Application Publication No. 2011/0232579 published for a Brush attachment for pet door. The "579" reference discloses a brush may be mounted on a typical pad-style pet door. As the pet uses the pet door, the brush may automatically sweep dirt, loose hair, leaves, grass, allergens, or other debris off the pet. The result may be both a cleaner pet and a cleaner house, as the debris may be brushed off the pet prior to the pet entering the house. The pet owner need not be present for the brush to reap its benefits.

Applicant believes that another related reference corresponds to U.S. Pat. No. 5,546,895 issued for a grooming brush pet door. The "895" reference comprises a pet door consisting of an opening filled by the bristles of a brush or brushes. An animal moves through the opening by pushing aside the flexible bristles, which reliably and quietly reseat the opening after the animal passes. Moving through the brushes is as natural to the animal as moving through tall grass or underbrush. The brushes perform a grooming function by removing dirt and debris from the animal's coat as it enters. The brushes have high insulating value due to the volume of air trapped among the bristles.

None of these references, however, teach of a device attachable to a pet door and has a truncated cone shape with the apex plane attached at the top of a pet door and the base underneath. The brushing effect is created by rows of teeth that can be constructed in sizes and lengths according to a pet's grooming needs. The device is operational when a pet's fur rubs against it while returning from outdoors. The device may be disposable when dirty and replaced. The device is useful for decreasing the volume of allergens and dirt from pet's fur upon re-entry to a building.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a device, with its truncated cone shape and rows of teeth, that serves as an effective grooming tool for pets. It allows for customizable grooming based on the pet's needs, providing a brushing effect that helps maintain the cleanliness and health of the pet's fur.

It is another object of this invention to provide a device wherein by brushing the pet's fur upon re-entry to a building, the device significantly contributes to decreasing the volume of allergens and dirt carried by the pet. This benefit is especially valuable for individuals with allergies, as it helps maintain a cleaner indoor environment by minimizing the transfer of allergens and dirt from the pet's fur.

It is still another object of the present invention to provide a device who's design allows it to be disposable when dirty and easily replaceable. This feature enhances hygiene and convenience for pet owners, as they can ensure the device is always in optimal condition. Regular replacement supports ongoing effectiveness in reducing allergens and dirt from the pet's fur.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Figure 1A:
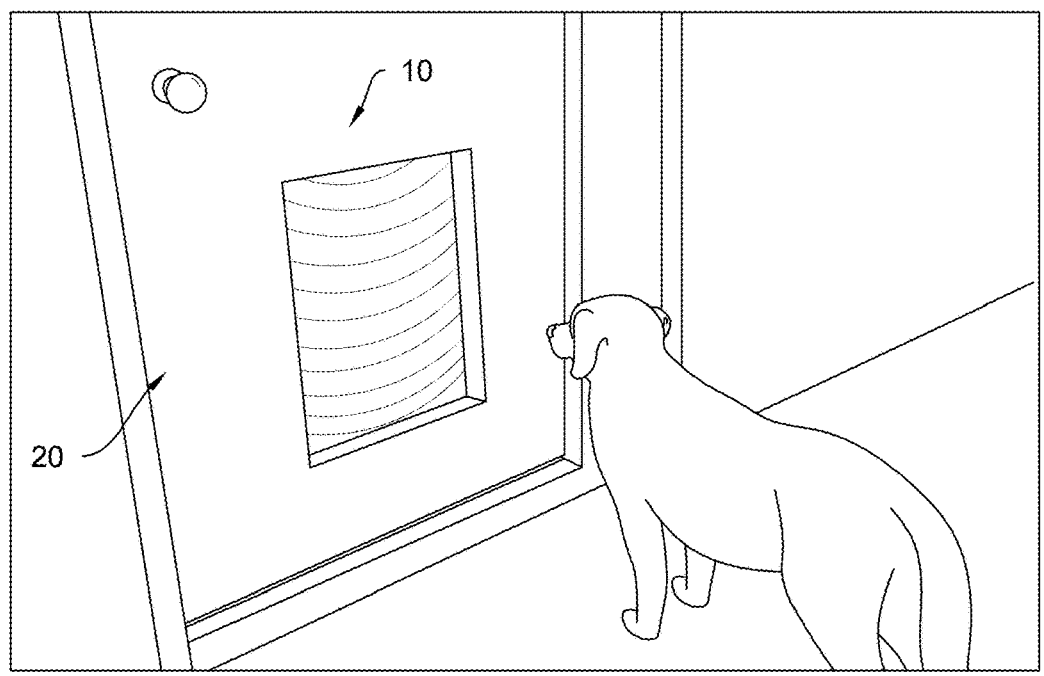
FIG. 1A-1B represent operational views of the present invention according to one embodiment thereof.

Referring now to the drawings, where the present invention is generally referred to with numeral 10, it can be observed that it basically includes a pet door 20, and a pet door pad 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The pet door 20 is a structure designed to allow pets to move in and out of a building independently. It typically consists of a frame that is mounted within an existing door, wall, or window, providing a passageway for pets to enter or exit without requiring human assistance as showcased in FIG. 1A-1B. The pet door 20 may include a frame that forms the outer structure of the pet door and is typically made of durable materials to withstand weather conditions and frequent use. Common materials for the frame include plastic, metal, or composite materials. The pet door 20 can be mounted directly onto existing doors, allowing pets to move freely in and out of the building. In another embodiments, the pet door 20 may be installed through the structure of an exterior or interior wall. In another embodiment, the pet door 20 designed to be mounted within windows, providing a convenient access point for pets. The pet door 20 may be made of plastic (commonly used for its lightweight and weather-resistant properties), metal (e.g., aluminum or other metals may be chosen for their durability and strength), composite materials (some pet doors utilize a combination of materials to achieve a balance of strength, insulation, and resistance to environmental factors), or the like. In one embodiment, the pet door 20 may have comprised an outer frame that may be mounted on the door, or the like.

Figure 2:
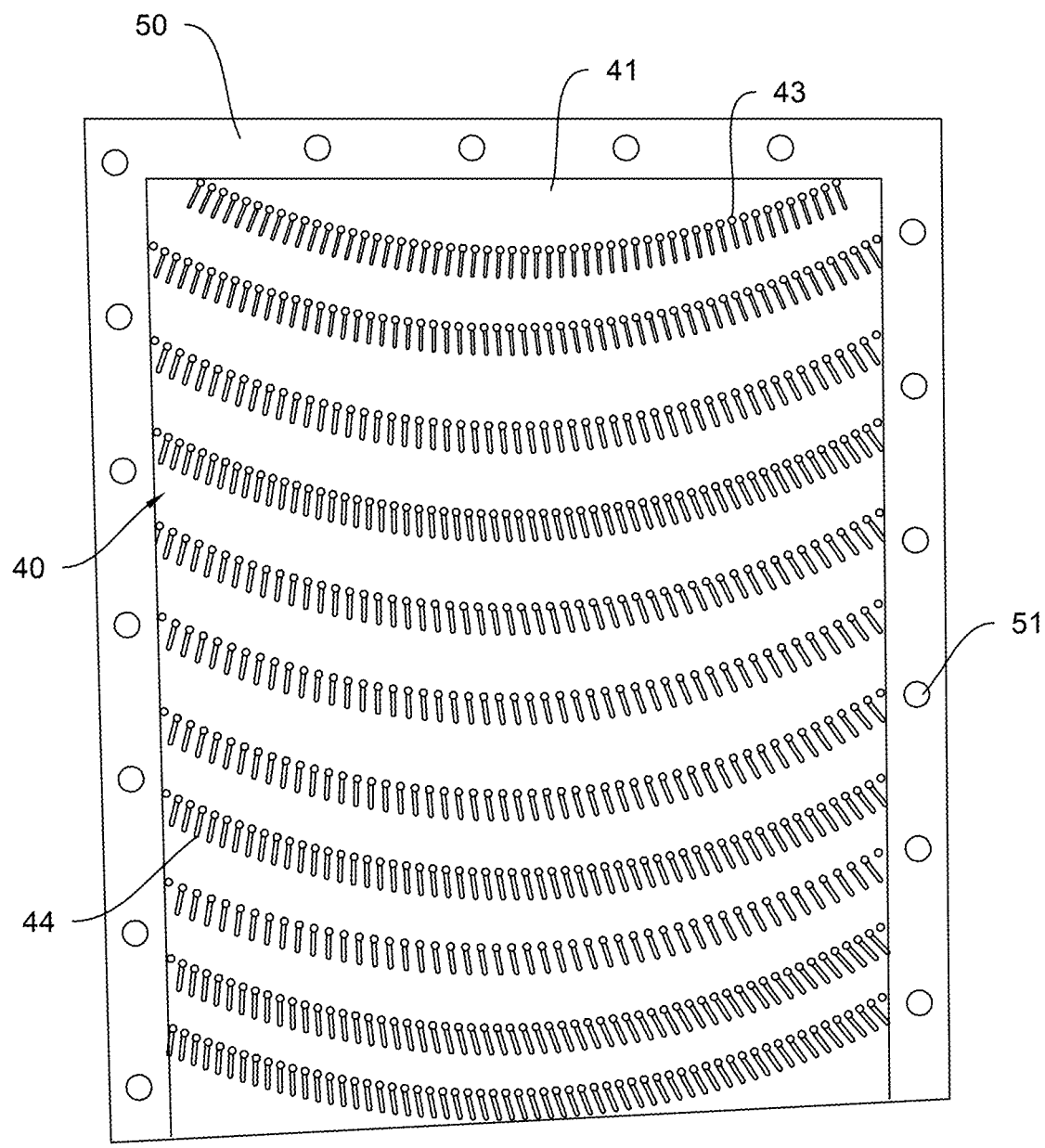
FIG. 2 shows a front view of the present invention according to one embodiment.

As showcased in FIG. 2, the present invention includes a body 50. In one embodiment, the body 50 may have a rectangular shape to conform with the geometry of the pet door 20. However, the overall structure of the body 50 may vary to meet various operational and/or mounting requirements. Body 50 typically consists of a perimeter or border made from materials such as wood, metal, plastic, or composite materials. In a suitable embodiment, the body 50 may be a modular element that can be removably attached to the pet door 20. The foregoing is achieved by means of fasteners 51 located on the inner surface of the body 50, wherein the fasteners 51 are located proximal to the periphery of the body 50 and are evenly separated one another as illustrated in FIG. 2. The fasteners 51 may be selected from a group comprising: magnets, adhesive strips, hooks and screws, clamps, clips, or any other suitable fasteners as known in the art. The body 50 features a central opening designed to encase the pet door pad 40

Figure 1B:
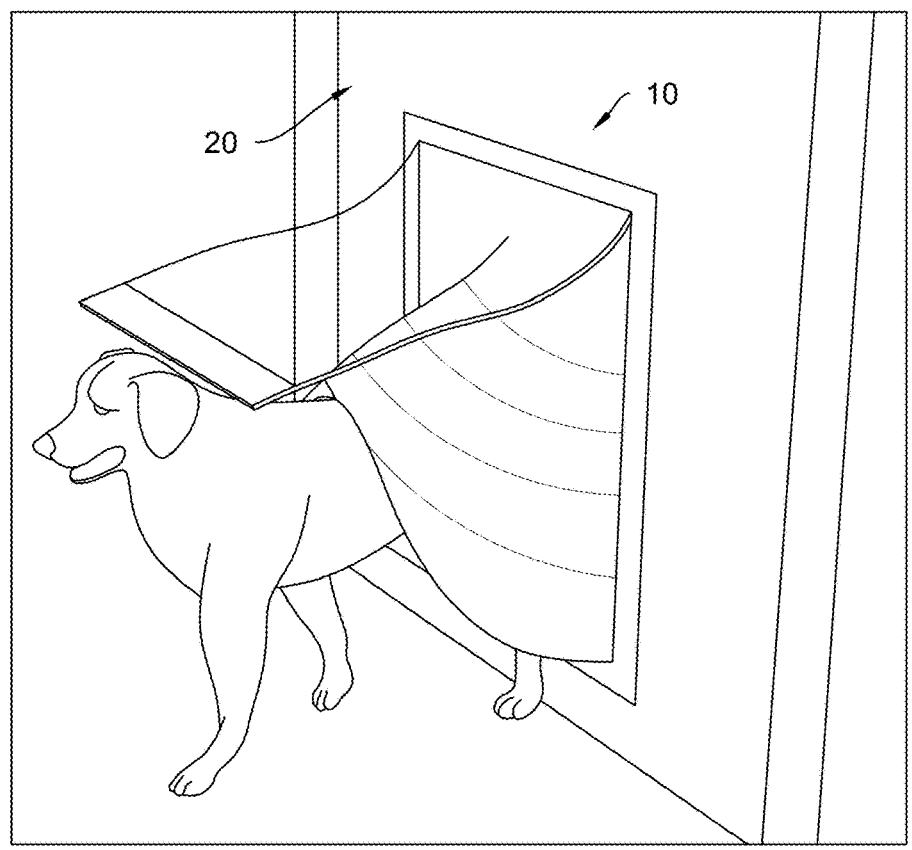
Figure 3:
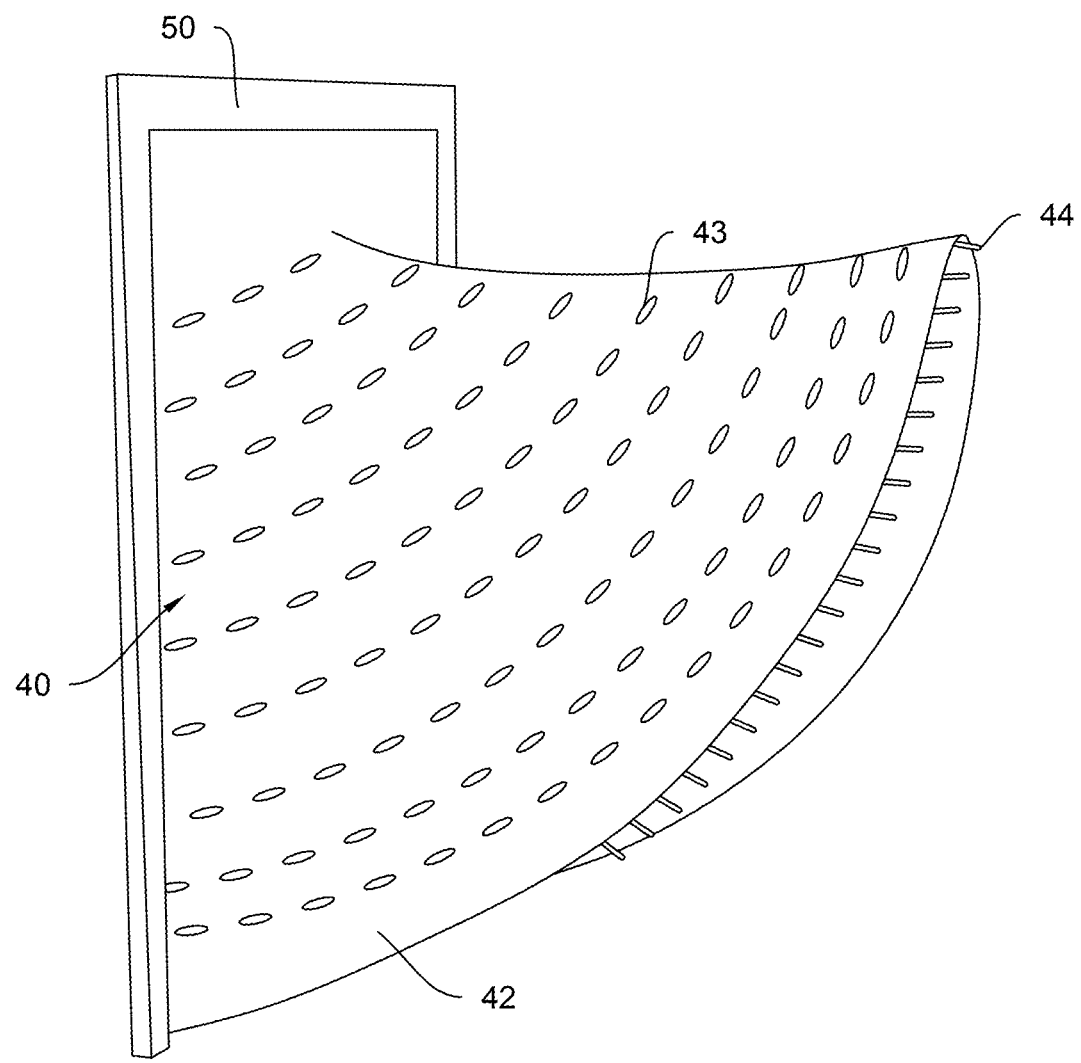
FIG. 3 illustrates a perspective view of the present invention according to one embodiment.

The pet door pad 40 includes sides 41, an openable portion 42, perforations 43, and bristles 44. As depicted in FIG. 3, the pet door pad 40 is partially attached to the pet door 20 at said sides 41, namely at lateral and top sides, however, for the sake of simplicity those are going to be referred to as sides 41 hereinafter. The openable portion 42 refers to the bottom side of the pet door pad 40 which, contrary to the sides 41, is not attached to the body 50 of the pet door 20. Instead, the openable portion 42 is capable of being extended for the animal to pass therethrough as depicted in FIG. 1B. The pet door pad 40 may include a series of perforations 43 distributed across its surface and preferably arranged in curved rows, as shown in FIG. 2. Wherein the perforations 43 arranged in curved rows face toward the openable portion 42, this configuration allows the central part of the pet door pad 40 to extend farther than its lateral sides. The perforations allow the pet door pad 40 to expand when extended through the openable portion 42, causing the perforations to open, and subsequently contract back to their original state, restoring the pet door pad 40 to its initial length after a pet has passed through. The bristles 44 may be disposed on both sides of the pet door pad 40. The bristles 44 may be made of a flexible material. The flexibility of the bristles 44 allows them to gently brush against the animal's fur as it passes through the pet door, serving multiple purposes. Firstly, the bristles assist in preventing drafts and minimizing the transfer of outdoor elements, such as dust or insects, into the indoor space. Secondly, the brushing action contributes to the removal of loose hairs from the animal's coat, reducing the likelihood of shedding within the living environment. The length and density of of the bristles 44 relative to the surface may be customized based on the length of the animal's hair. For animals with shorter hair, shorter and denser bristles may be employed to effectively capture loose hairs. Conversely, animals with longer hair may benefit from longer and more widely spaced bristles, accommodating their specific grooming needs without causing any tangling or discomfort during passage.

The modular fashion of the present invention, by means of the fasteners 51 allows the invention to be easily removed, disposed of, and replaced whenever needed. Especially when the pet door pad 40 is cluttered with outdoor debris. It is then suitable that both the body 50 and the pet door pad 40 are made of a biodegradable material.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A pet door groomer, comprising:
   a) a pet door; and
   b) a pet door pad encased by a body; wherein said pet door pad is removably attached to said pet door; said pet door pad has sides attached to the body and an openable portion located at the bottom of said pet door pad, said pet door pad having perforations distributed along a surface of said pet door pad, wherein said perforations are arranged in independent rows extending from a first lateral side to an opposite lateral side of said pet door pad, each row forming a concave curve facing toward said openable portion, wherein said perforations enable said pet door pad to extend from an original length of said pet door pad; the pet door pad further includes bristles disposed on at least one surface of said pet door pad, wherein each perforation has at least one bristle positioned adjacent thereto;
   c) the pet door pad deforms and extends when an animal passes through the openable portion by means of said perforations.

2. The pet door groomer of claim 1, wherein said body includes fasteners placed along a surface of the body; said body is removably attached, by means of the fasteners, to the pet door.

3. A pet door groomer, comprising:
   a) a pet door;
   b) a pet door pad encased by a body; wherein said body has fasteners placed along a border of said body to removably secure the pet door pad to said pet door; said pet door pad has lateral sides and a top side attached to the body and an openable portion located at the bottom of said pet door pad, wherein said openable portion is detached from said body; said pet door pad having perforations distributed along a surface of said pet door pad, wherein said perforations are arranged in independent rows extending from one lateral side to an opposite lateral side of said pet door pad, each row forming a concave curve facing toward said openable portion, wherein said perforations enable said pet door pad to outwardly extend from an original length of said pet door pad; the pet door pad further includes bristles disposed on at least one surface of said pet door pad, where the bristles are arranged in curved rows from one of the lateral side of the pet door pad to an opposite lateral side, wherein each perforation has at least one bristle positioned adjacent thereto;

c) the pet door pad is configured to deform and extend when an animal passes through the openable portion;

d) the modularity of the body enclosing the pet door pad by means of the fasteners enables the pet door groomer to be removed, disposed of, and replaced when the pet door pad is cluttered with outdoor debris.

4. A pet door groomer, consisting of:

a) a biodegradable body having a border and a central opening, the body has fasteners disposed on said border;

b) a pet door pad encased by said body; said pet door pad has lateral sides and a top side attached to the body and an openable portion located at the bottom of said pet door pad, wherein said openable portion is detached from said body; said pet door pad having perforations distributed along a surface of said pet door pad, wherein said perforations are arranged in independent rows extending from one lateral side to an opposite lateral side of said pet door pad, each row forming a concave curve facing toward said openable portion, wherein said perforations enable said pet door pad to outwardly extend from an original length of said pet door pad; the pet door pad further includes bristles disposed on at least one surface of said pet door pad, where the bristles are arranged in curved rows from one of the lateral side of the pet door pad to an opposite lateral side, herein each perforation has at least one bristle positioned adjacent thereto;

c) the pet door pad deforms and extends when an animal passes through the openable portion by virtue of said perforations; and d) the modularity of the body enclosing the pet door pad by means of the fasteners enables the pet door groomer to be removed, disposed of, and replaced when the pet door pad is cluttered with outdoor debris.

* * * * *